US011809416B2

(12) United States Patent
Weerasinghe et al.

(10) Patent No.: US 11,809,416 B2
(45) Date of Patent: Nov. 7, 2023

(54) QUERY VALIDATION WITH AUTOMATED QUERY MODIFICATION

(71) Applicant: Charter Communications Operating, LLC, St. Louis, MO (US)

(72) Inventors: Srilal M. Weerasinghe, Parker, CO (US); Vipul Patel, Great Falls, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 98 days.

(21) Appl. No.: 17/375,786

(22) Filed: Jul. 14, 2021

(65) Prior Publication Data

US 2023/0017396 A1 Jan. 19, 2023

(51) Int. Cl.
*G06F 7/00* (2006.01)
*G06F 16/242* (2019.01)
*G06N 5/04* (2023.01)
*G06N 20/00* (2019.01)
*G06F 21/62* (2013.01)

(52) U.S. Cl.
CPC ...... *G06F 16/2425* (2019.01); *G06F 21/6227* (2013.01); *G06N 5/04* (2013.01); *G06N 20/00* (2019.01)

(58) Field of Classification Search
CPC . G06F 16/2425; G06F 21/6227; G06N 20/00; G06N 5/04
USPC .................................................. 707/600–899
See application file for complete search history.

(56) References Cited

U.S. PATENT DOCUMENTS

2019/0318121 A1\* 10/2019 Hockenbrocht .... G06F 16/2456

OTHER PUBLICATIONS

Haeberlen, A. et al., "Differential Privacy Under Fire," 20th USENIX Security Symposium, Aug. 2011, https://static.usenix.org/events/sed11/tech/full_papers/Haeberlen.pdf, 15 pages.
Lomas, N., "Privacy researchers devise a noise-exploitation attack that defeats dynamic anonymity," TechCrunch, Aug. 17, 2019, https://techcrunch.com/2019/08/17/privacy-researchers-devise-a-noise-exploitation-attack-that-defeats-dynamic-anonymity/, 15 pages.
Schmelzer, R. et al., "Understanding Explainable AI," Forbes, Jul. 23, 2019, https://www.forbes.com/sites/cognitiveworld/2019/07/23/understanding-explainable-ai/?sh=78b95c327c9e, 4 pages.

(Continued)

*Primary Examiner* — Isaac M Woo
(74) *Attorney, Agent, or Firm* — Dority & Manning, P.A.

(57) ABSTRACT

Disclosed herein are embodiments providing query validation with automated query modification. In particular, the embodiments provide a computing system that receives a query and determines the query is sensitive. The computing system iteratively modifies the query until the query is not sensitive by modifying the query to increase a scope of the query, updating estimated query results based on the query as modified, and determining whether the query as modified is sensitive based on the estimated query results as updated. Upon determining that the query as modified is not sensitive, the computing system proceeds with the query as modified. Accordingly, the computing system improves query efficiency by automatically modifying a sensitive query.

20 Claims, 6 Drawing Sheets

(56) References Cited

OTHER PUBLICATIONS

Turek, M., "Explainable Ailincial Intelligence (XAI)," DARPA, 2018, accessed Nov. 3, 2021 from https://www.darpa.mil/program/explainable-artificial-intelligence, 3 pages.

Vivier, R. et al., "Are You Curious to Understand How The Programmatic Ad Ecosystem (DSP, SSP, DMP) Works in Detail?" DigitalThought.me, Mar. 24, 2018, https://www.linkedin.com/pulse/you-curious-understand-how-programmatic-ad-ecosystem-dsp-vivier, 13 pages.

* cited by examiner

| | ACTUAL DATA | POSSIBLE RESPONSES (WITH NOISE ADDED) | | |
|---|---|---|---|---|
| 1 | Y | Y | Y | N |
| 2 | Y | Y | N | Y |
| 3 | Y | Y | Y | Y |
| 4 | Y | N | N | Y |
| 5 | Y | Y | Y | Y |
| 6 | Y | Y | Y | Y |
| 7 | Y | N | Y | Y |
| 8 | N | Y | Y | Y |
| 9 | N | N | Y | N |
| 10 | N | N | N | Y |
| Total | 7Y / 3N | 6Y / 4N | 7Y / 3N | 8Y / 2N |
| | | 60(1) | 60(2) | 60(3) |

| USER ID | USER NAME | POSTCODE | AGE | DISEASE |
|---|---|---|---|---|
| 1 | ALEX | 07640 | 29 | ARTHRITIS |
| 2 | BETH | 07640 | 22 | ARTHRITIS |
| 3 | CHRIS | 07640 | 27 | ARTHRITIS E |
| 4 | DENISE | 07945 | 43 | FLU |
| 5 | ELLIE | 07945 | 52 | ARTHRITIS |
| 6 | FRED | 07322 | 47 | CANCER |
| 7 | GERALD | 07355 | 30 | ARTHRITIS |
| 8 | HENRY | 07377 | 36 | CANCER |
| 9 | ISLA | 07389 | 32 | CANCER |

*FIG. 5A*

| PATIENT NAME | POSTCODE | AGE GROUP | DISEASE | |
|---|---|---|---|---|
| * | 076** | UNDER 30 | ARTHRITIS | |
| * | 076** | UNDER 30 | ARTHRITIS | 82(1) |
| * | 076** | UNDER 30 | ARTHRITIS | |
| * | 079** | OVER 40 | FLU | |
| * | 079** | OVER 40 | ARTHRITIS | 82(2) |
| * | 073** | OVER 40 | CANCER | |
| * | 073** | 30 TO 40 | ARTHRITIS | |
| * | 073** | 30 TO 40 | CANCER | 82(3) |
| * | 073** | 30 TO 40 | CANCER | |

*FIG. 5B*

| PATIENT NAME | POSTCODE | AGEGROUP | DISEASE | |
|---|---|---|---|---|
| * | 076** | UNDER 30 | ARTHRITIS | |
| * | 076** | UNDER 30 | ARTHRITIS | 84(1) |
| * | 076** | UNDER 30 | FLU | |
| * | 076** | UNDER 30 | CANCER | |
| * | 079** | OVER 40 | ARTHRITIS | |
| * | 079** | OVER 40 | ARTHRITIS | 84(2) |
| * | 079** | OVER 40 | FLU | |
| * | 079** | OVER 40 | PNEUMONIA | |

*FIG. 6*

QUERY VALIDATION WITH AUTOMATED QUERY MODIFICATION

BACKGROUND

Queries may be reviewed to determine whether the query is sensitive. For example, certain queries may be determined to be a privacy risk. If a query is determined to be sensitive, often the query is blocked. However, doing so limits the utility and value of the database, increases database traffic due to repeated attempts of failed queries, and may disrupt the workflow of those running the query.

SUMMARY

The embodiments disclosed herein provide query validation with automated query modification. In particular, the embodiments provide a computing system that receives a query and determines the query is sensitive. The computing system iteratively modifies the query until the query is not sensitive by modifying the query to increase a scope of the query, updating estimated query results based on the query as modified, and determining whether the query as modified is sensitive based on the estimated query results as updated. Upon determining that the query as modified is not sensitive, the computing system proceeds with the query as modified. Accordingly, the computing system improves query efficiency by automatically modifying a sensitive query.

In one embodiment, a method is provided. The method includes receiving, by a computing system comprising one or more processor devices, a query. The method further includes determining, by the computing system, that the query is sensitive. The method further includes iteratively modifying, by the computing system, the query until the query is not sensitive. The iterative modification includes modifying the query to increase a scope of the query. The iterative modification further includes updating estimated query results based on the query as modified. The iterative modification further includes determining whether the query as modified is sensitive based on the estimated query results as updated. The method further includes, upon determining that the query as modified is not sensitive, proceeding, by the computing system, with the query as modified.

In another embodiment, a computer system is provided. The computer system includes one or more processor devices of one or more computing devices. The one or more processor devices are configured to receive a query. The one or more processor devices are further configured to determine that the query is sensitive. The one or more processor devices are further configured to iteratively modify the query until the query is not sensitive. The iterative modification includes modifying the query to increase a scope of the query. The iterative modification further includes updating estimated query results based on the query as modified. The iterative modification further includes determining whether the query as modified is sensitive based on the estimated query results as updated. The one or more processor devices are further configured to, upon determining that the query as modified is not sensitive, proceed with the query as modified.

In another embodiment, a computer program product is stored on a non-transitory computer-readable storage medium and includes instructions to cause one or more processor devices to receive a query. The one or more processor devices are configured to determine whether the query is sensitive. The one or more processor devices are configured to iteratively modify the query until the query is not sensitive. The iterative modification including modifying the query to increase a scope of the query. The iterative modification further includes updating estimated query results based on the query as modified. The iterative modification further includes determining whether the query as modified is sensitive based on the estimated query results as updated. The one or more processor devices are further configured to, upon determining that the query as modified is not sensitive, proceed with the query as modified.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 5A is a chart of data before applying a k-anonymity generator of the privacy controller of FIG. 1;

FIG. 5B is a chart illustrating a k-anonymity generator of the privacy controller of FIG. 1;

FIG. 6 is a chart illustrating an l-diversity generator of the privacy controller of FIG. 1;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Validating a query prior to execution may be used to correct syntax, prevent hacking attacks, and/or prevent privacy attacks. In particular, queries that may undermine privacy mechanisms may be deemed sensitive and are often completely blocked from execution. However, such practice may lead to frustration, increased cost, and/or inefficiencies, especially as the user may not have been trying to circumvent privacy mechanisms or know why their query was blocked. For example, in advertising, sensitive queries may be constructed inadvertently due to micro-targeting. Blocking sensitive queries may increase database traffic due to repeat attempts of failed queries.

The examples disclosed herein provide query validation with automated query modification. In particular, the embodiments provide a computing system that receives a query, determines the query is sensitive, and iteratively modifies the query to increase a scope of the query until the query as modified is no longer sensitive. Accordingly, the computing system improves query efficiency by automatically modifying a sensitive query. In certain embodiments, the querier may be notified as to why the query was deemed sensitive, determine modifications for a failed query to execute successfully, and/or enhance privacy protection mechanisms based on identified sensitive queries.

Figure 1:
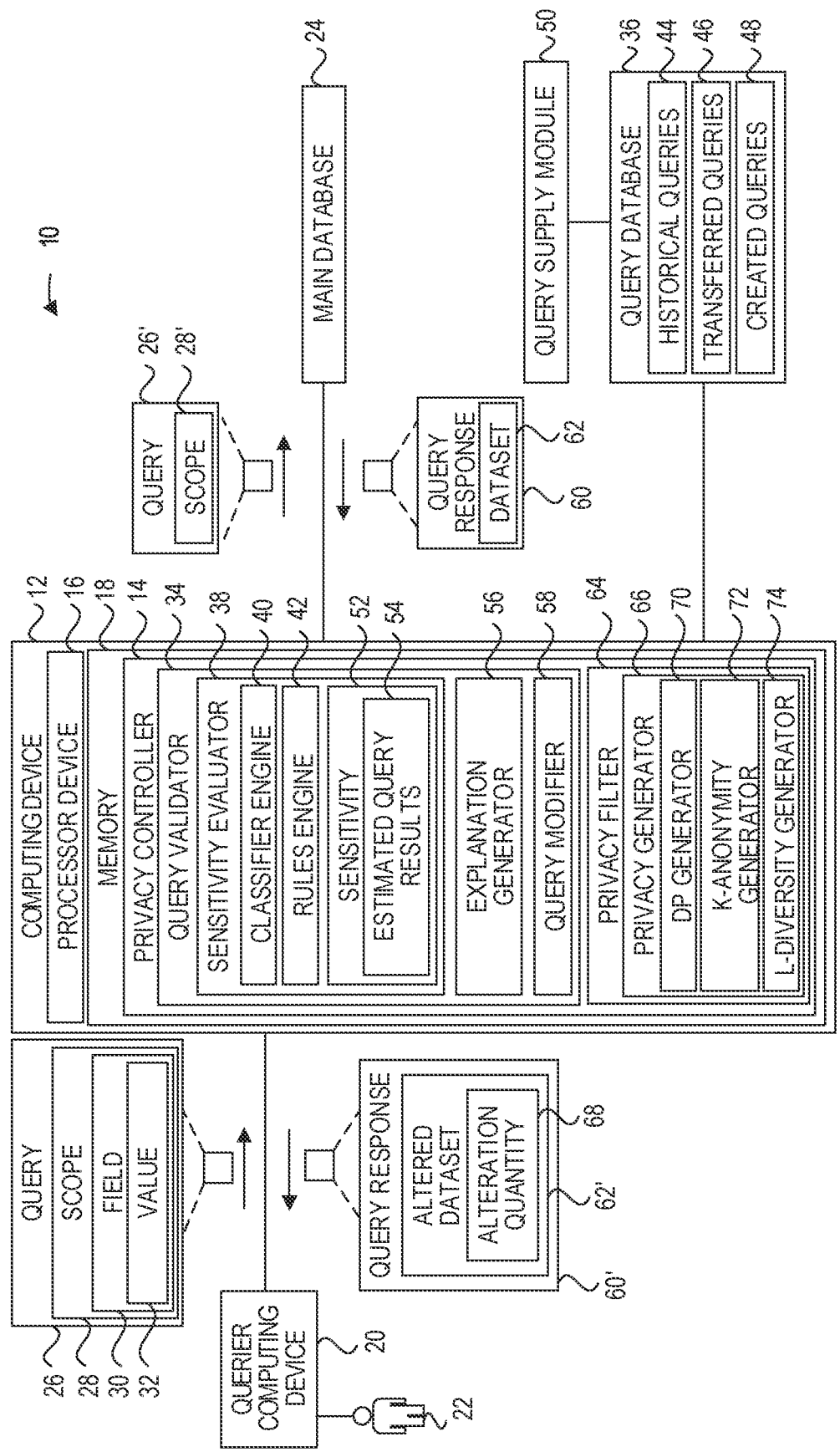
FIG. 1 is a block diagram of a system for query validation with automated query modification, illustrating certain aspects of various embodiments disclosed herein.

FIG. 1 is a block diagram of a system 10 for query validation with automated query modification, illustrating certain aspects of various embodiments disclosed herein. The system 10 includes a computing device 12, including a privacy controller 14, a processor device 16, and a memory 18 coupled to the processor device 16. Although only the privacy controller 14 is illustrated with a processor device 16 and a memory 18, any component may include a processor device 16 (or processor device set) and/or a memory 18 (or memory set).

Because the privacy controller 14 is a component of the computing device 12, functionality implemented by the privacy controller 14 may be attributed to the computing device 12 generally. Moreover, in examples where the privacy controller 14 comprises software instructions that program the processor device 16 to carry out functionality discussed herein, functionality implemented by the privacy controller 14 may be attributed herein to the processor device 16.

It is further noted that while the privacy controller 14 among other software components is shown as a separate component, in other implementations, the privacy controller 14 with other software components could be implemented in a single component or could be implemented in a greater number of components than two. Finally, it is noted that while, for purposes of illustration and simplicity, the embodiments are illustrated as being implemented by a processor device set that includes a single processor device on a single computing device, in other environments, such as a distributed and/or clustered environment, the embodiments may be implemented on a computer system that includes a processor device set that includes a plurality of processor devices of a plurality of different computing devices, and functionality of the embodiments may be implemented on different processor devices of different computing devices. Thus, irrespective of the implementation, the embodiments may be implemented on a computer system that includes a processor device set made up of one or more processor devices of one or more computing devices.

The privacy controller 14 is configured to coordinate privacy in communications between a querier computing device 20 of a querier 22 or source and a main database 24. The privacy controller 14 may use a REST (representational state transfer) API (application programming interface) to communicate with other system components. Although only one querier computing device 20 and one main database 24 are illustrated, multiple querier computing devices 20 and/or main databases 24 may be used. The main database 24 may be a relational database management system (RDBMS) or NoSQL, or the like.

A querier 22 may create a query 26 having a scope 28. The scope 28 of the query 26 may include fields 30, where each field has at least one value 32. The fields 30 may include one or more types of fields 30, such as income bracket, age group, zip code, race, favorite television shows, and the like. The values 32 for each of those fields 30 may include one or more parent categories, one or more sub-categories of the one or more parent categories, a numeric value, a numeric range, or the like. The term "forward path" as used herein refers to a path from the querier computing device 20 to the main database 24. The term "return path" refers to a path from the main database 24 to the querier computing device 20. The forward path and the return path may be indirect paths such that the communicating devices are in communication with one another via the computing device 12 and/or other communicating devices or software components.

The privacy controller 14 receives the query 26 and performs syntax and security compliance checks. In certain embodiments, the query 26 may be retrieved from a Landing server (may also be referred to as a Gateway server). The privacy controller 14 then evaluates the query 26 using a query validator 34. The query validator 34 is configured to validate the query 26 before forwarding the query 26 to the main database 24. In particular, the query validator 34 determines whether a query 26 is sensitive and then iteratively modifies the query 26 until the query 26 is no longer sensitive. The query validator 34 does so without querying the main database 24. Instead, a query database 36 may be used to train the query validator 34.

The query validator 34 determines whether to allow or block the query 26 from executing. The query validator 34 prevents an individual from running queries 26 that are too sensitive and may reveal the identity of a target user. For example, an individual may run a high number of similar queries 26 to glean private information, such as target user identity, from the data in the aggregate. As another example, there are thousands of attributes, such as demographic data and viewership data, that may be used by an individual to formulate a focused and sensitive query 26. As yet another example, by running the same query 26 many times and averaging out the results, an adversary may be able to make a close guess as to the actual results. Accordingly, if the query 26 is determined to be too sensitive based on predetermined rules (e.g., frequency of similar queries over a predetermined time period), the query validator 34 temporarily blocks the query 26. If the query 26 is determined not to be too sensitive, the query validator 34 allows the query 26.

The query validator 34 includes a sensitivity evaluator 38 to determine whether the query 26 is sensitive, where sensitivity refers to whether the query 26 presents a potential privacy risk. Queries 26 may be directed to a variety of records in the main database 24, such as income bracket, age group, zip code, race, favorite television shows, and the like. Adding more fields 30 and/or limiting the value 32 (e.g., limit the age group to 50-51 rather than 50-60) may create targeted queries 26, which may be more revealing of data privacy. Sensitivity of a query 26 may be within a single query 26 or within multiple queries 26, such as may be coordinated to exploit gaps in privacy security. Further, the sensitivity of a query 26 is a function of the query response to a particular query 26. In other words, the query 26 is sensitive because of the data retrieved in response to the query 26, not because of the query 26 itself. Instead of blocking or invalidating sensitive queries 26, the computer system 10 expands the scope 28 of the query 26 until the query 26 is no longer sensitive.

The sensitivity evaluator 38 may include a classifier engine 40 providing machine-learning artificial intelligence. In certain embodiments, a rules engine 42 may also be used to train the classifier engine 40 and/or run in association with the classifier engine 40. The rules engine 42 may include manually entered rules, such as may be representative of expert input. In certain embodiments, the rules of the rules engine 42 are manually constructed to define instructions, thresholds, and the like. For example, one rule may be that a query 26 is sensitive if the query response is expected to contain less than five records. Another rule may be that a query 26 is sensitive if the query 26 has a combination of certain categories in the query string. Another rule may be that a query 26 is sensitive if similar queries 26 originated from the same source; as such queries 26, may be indicative of a coordinated attack.

In particular, the classifier engine 40 of the sensitivity evaluator 38 may be trained using a query database 36 including historical queries 44, transferred queries 46, and/or created queries 48 that may be populated by a query supply module 50. The query database 36 includes query strings over a wide range of conditions with outputs that are classified as sensitive or not, such as by privacy experts and/or a rules engine 42. The query strings that were classified as sensitive form the inputs for training the classifier engine 40.

Historical queries 44 may include queries 26 previously run on the main database 24. Transferred queries 46 may include queries 26 obtained by external entities, such as for training purposes, as similarly used in Amazon Rekognition, Microsoft Azure, or the like. These transferred queries 46 may be leveraged for transfer learning, in which external data is used to train a machine learning engine, and local data is then used to fine-tune the machine learning engine. Created queries 48 may include queries 26 that are modified from existing queries 26. For example, suppose an existing query 26 has the qualifiers area code, age bracket, vehicle driven, and hobbies. Then each qualifier may be automatically changed and tested for sensitivity changes. For example, the 'hobbies' qualifier may be replaced with 'movies watched,' and/or the age bracket may be reduced from 50-60 to 50-55.

Accordingly, the classifier engine 40 receives the query 26 and determines a sensitivity 52 of the query 26. In certain embodiments, the classifier engine 40 may be a binary yes/no and/or a graded score based on a sensitivity spectrum, such as on a scale of one to five. The sensitivity 52 may be based on estimated query results 54 of running the query 26 on the main database 24. However, the estimated query results 54 are estimated based on the query database 36. The query 26 may be determined to be sensitive based on the estimated query results 54 being below a predetermined threshold and/or based on a combination of fields in the query 26.

The query validator 34 further includes an explanation generator 56 (may also be referred to as Explainable AI (XAI), Interpretable-AI, Responsible-AI, etc.). The explanation generator 56 provides reasons and explanations as to why certain queries 26 were considered sensitive. Many traditional machine learning models function as black boxes. For example, traditional machine learning models may classify a photo of an animal as a cat but fail to explain why that decision was made.

Upon determining that a query 26 is sensitive, the query 26 is provided as an input into the explanation generator 56, while the output of the explanation generator 56 provides the contributing factors as to why the query 26 was classified as sensitive. In particular, the explanation generator 56 parses the query 26 to determine a plurality of contributing factors and determines which factor was the biggest contributor. In other words, the query validator 34 determines which feature of the query 26 narrows the results the most.

The query validator 34 further includes a query modifier 58, which relaxes or expands the scope 28 of the biggest contributor of the query 26. The query modifier 58 may refer to the rules engine 42 to expand the scope 28 of the query 26. The scope 28 may be expanded by changing the value 32 of the query 26, such as changing a range requested. The scope 28 may be expanded by adding corresponding sub-categories, expanding a sub-category to a parent category, or adding additional fields.

Once modified, the query 26' as modified is resubmitted to the classifier engine 40, and the process repeats until the query 26' as modified is determined not to be sensitive. The classifier engine 40 updates estimated query results 54 based on the query 26' as modified and then determines whether the query 26' as modified is sensitive based on the estimated query results 54 as updated. This process may require at least one iterative modification or at least two iterative modifications. The scope 28 may be expanded by expanding a value 32 (e.g., range) of a field 30 of the query 26, expanding a field 30 of the query 26, or the like. In particular, the scope 28 may be expanded by increasing a range of the query 26, adding, to a sub-category of a parent category of the query 26, another sub-category to the query 26 of the parent category, expanding a sub-category of a parent category of the query 26 to the parent category, and/or changing a portion of the query 26 to a wild card, or the like. It is noted that each query evaluation may be used to inform the classifier engine 40 as to future classifications of other queries 26, such that the classifier engine is adaptable.

In one illustrative example, the field 30 of Ethnic Code includes hundreds of sub-categories, including Danish, Swedish, Norwegian, Finnish, and Icelandic. Assume that a query 26 includes the field 30 of Ethnic Code and was estimated by the sensitivity evaluator 38 to return only five records of individuals. The classifier engine 40 of the sensitivity evaluator 38 classifies the query 26 as sensitive. The explanation generator 56 determines that the contributing factor for sensitivity is that Ethnic Code [field]=Danish [value]. The query modifier 58 expands the scope 28 of the query 26 until the scope 28' of the query 26' is expanded to no longer be sensitive. Thus, the query validator 34 provides the following iterative example query modifications for the field 30 of Ethnic Code: (1) Danish; (2) Danish+Swedish; (3) All Scandinavian Countries; (4) All Nordic Countries; (5) Nordic+Baltic countries.

In another illustrative example, zip code 78717 is identified as the largest contributor of a sensitivity classification. A wildcard is provided such that the zip code is 7871X (e.g., to include 78711, 78712, 78713, etc.), thereby broadening the scope 28' of the query 26' and increasing the estimated query results 54.

In another illustrative example, a query 26 is classified as sensitive, and the explanation generator 56 provides that the contributing factors are as follows: (1) Ethnic Code=Danish, (2) Age Bracket=50-55, (3) Income Range=100 k–110 k. The query validator 34 makes multiple iterative modifications and evaluations that classify the query 26 as sensitive as follows: (1) Ethnicity, Age, Income, (2) Ethnicity, Age, (3) Age. Then the query validator 34 expands the age bracket+/−5 years gradually, such that the age ranges for each iteration are: (1) 50-55, (2) 50-60, (3) 45-55, (4) 50-65, (5) 40-55, and (6) 45-60. This proceeds until the query validator 34 provides that the query 26' as modified is not sensitive.

Such a configuration avoids trial and error of the querier 22 submitting multiple queries 26, each being blocked without explanation. Further, such a configuration avoids merely adding statistical noise and inflating a query response 60, which may skew the results and lower the utility value of the main database 24. In certain embodiments, the querier 22 is advised as to the reasons for classifying the query 26 as sensitive and preventing the query 26 from executing.

Once the query 26' as modified is determined to be not sensitive, the query 26' is forwarded to the main database 24, which may be one or more databases, and then executed. The main database 24 then generates a query response 60 and dataset 62 responsive to the query 26' and sends the query response 60 to the privacy controller 14. The privacy controller 14 receives a query response 60 with a dataset 62.

The privacy controller 14 may include a privacy filter 64 to alter the dataset 62 of the query response 60 to obfuscate the data. The privacy filter 64 of the privacy controller 14 processes the query response 60 using a privacy generator 66 of the privacy controller 14 to obfuscate user data provided in the dataset 62 of the query response 60. In certain embodiments, based on a sensitivity of the dataset 62 (e.g., size of the dataset), the privacy controller 14 alters the dataset 62 of the query response 60 by an alteration quantity 68, sometimes referred to as a privacy parameter, to generate an altered dataset 62' for transmission to the querier computing device 20. The alteration quantity 68 may depend on the size of the dataset 62 and/or the size of the main database 24 queried. For example, the same query 26 made to different databases may result in thousands of records from one database and a handful of records from another.

In certain embodiments, altering the dataset 62 includes adding noise (e.g., based on a Laplace distribution) to obfuscate identities of individuals within the dataset 62. In certain embodiments, the alteration quantity 68 is within a first predetermined error margin (e.g., less than 3%). In certain embodiments, the privacy generator 66 includes a differential privacy (DP) generator 70, a k-anonymity generator 72, and/or an l-diversity generator 74 (discussed in more detail below). However, other privacy generators and/or protocols could be used.

The query response 60' with the altered dataset 62' altered by the alteration quantity 68 is then transmitted to the querier computing device 20. As noted above, in certain embodiments, the querier 22 is advised as to the reasons for classifying the query 26 as sensitive and preventing the initial query 26 from executing.

Figure 2:
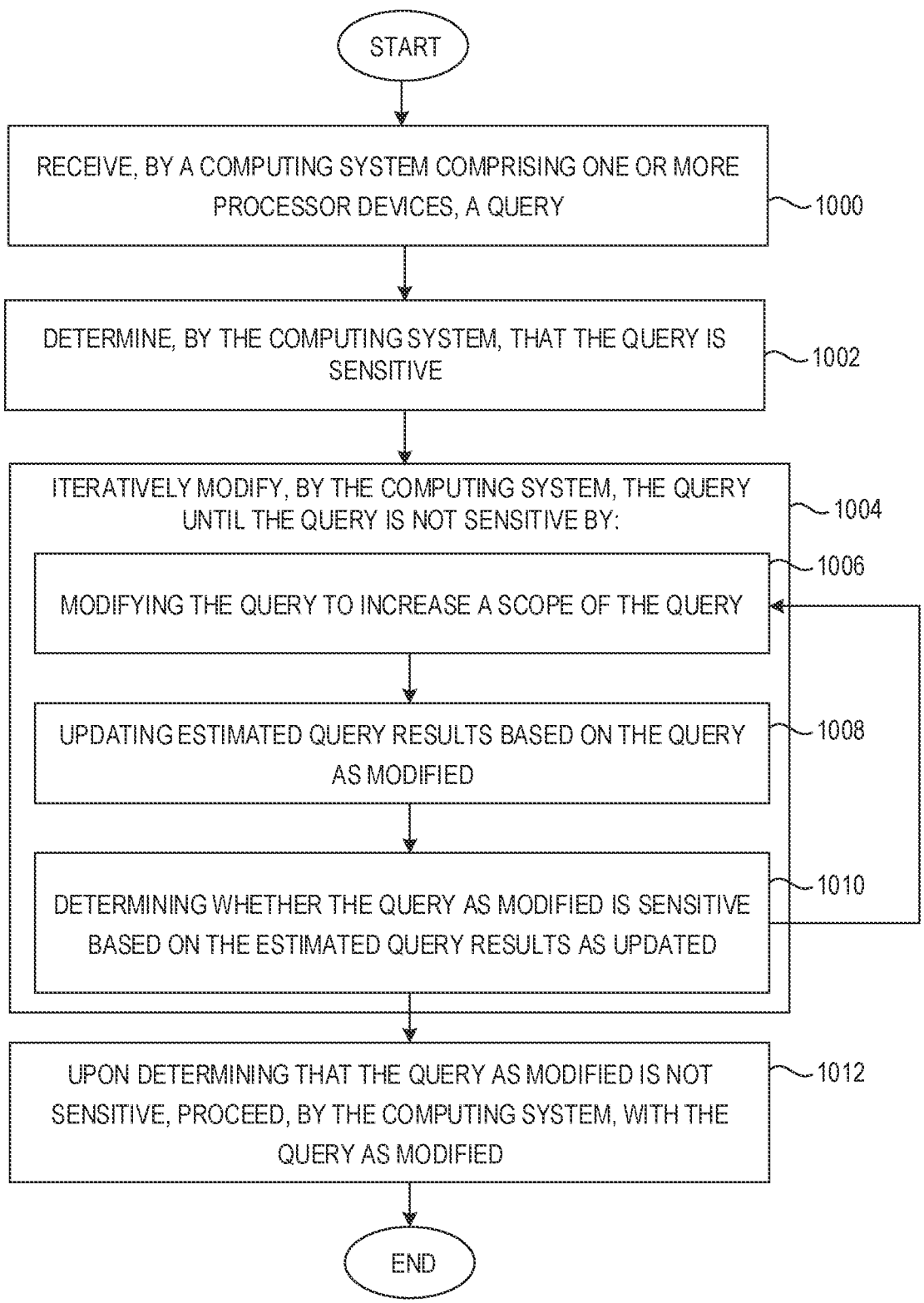
FIG. 2 is a flowchart illustrating processing steps for query validation with automated query modification.

FIG. 2 is a flowchart illustrating processing steps using the system of FIG. 1. The computing system 10 comprising one or more processor devices 16 receives a query 26 (1000). The computing system 10 determines that the query 26 is sensitive (1002). The computing system 10 iteratively modifies the query 26 until the query 26 is not sensitive (1004). Iterative modification includes modifying the query 26 to increase a scope 28 of the query 26 (1006). Iterative modification includes updating estimated query results 54 based on the query 26' as modified (1008). Iterative modification includes determining whether the query 26' as modified is sensitive based on the estimated query results 54 as updated (1010). Upon determining that the query 26' as modified is not sensitive, the computing system 10 proceeds with the query 26' as modified (1012).

Figures 3, 4:
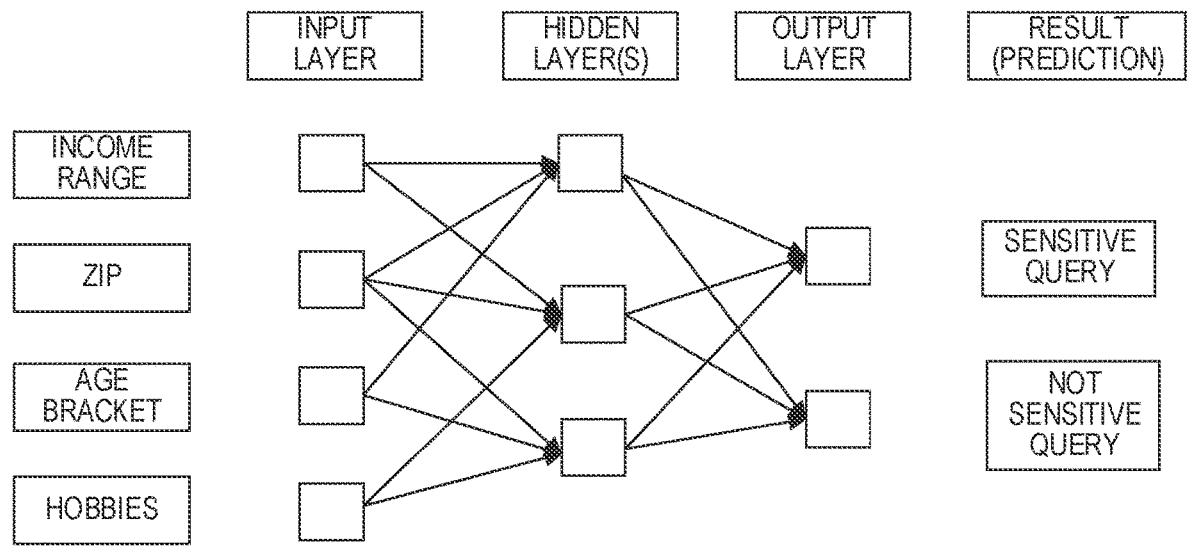
FIG. 3 is a block diagram illustrating functioning of the classifier engine as a neural network-based supervised machine learning engine.
FIG. 4 is a chart illustrating a differential privacy generator of the privacy controller of FIG. 1.

FIG. 3 is a block diagram illustrating functioning of the classifier engine 40 as a neural network-based supervised machine learning engine. The categories in the query database 36 form the input layer. The output layer has a binary output for predicting if a query 26 is sensitive or not. The categories and results provided are illustrative, and the system may include additional or alternative options.

During the training, queries 26 with known outcomes (sensitive/not) are used to update the weights in the classifier engine 40. Weights of each link determine the impact of a category. Once trained, the classifier engine 40 can classify whether a new query 26 is sensitive or not.

Alternately the classifier engine 40 could grade sensitivity 52 using a sensitivity score to provide a more granular assessment. For example, the sensitivity score could be graded from one to five. This sensitivity score could be used to configure the privacy filter 64 or similar obfuscation technique. The sensitivity score would be an additional data point for tuning or estimating an epsilon value used for privacy filters 64, such as differential privacy or other obfuscation techniques. For more than two (binary) outcomes, multinomial logistic regression may be used as a machine learning paradigm.

It is noted that network-based supervised machine learning based on classification by experts and/or the rules engine 42 may be best suited for databases 24 that are generally static. For databases 24 that are volatile with frequent changes, random forest statistical methods may be used. Random/probabilistic forests include a multitude of decision trees. Each tree has pre-set conditions that determine sensitivity, such as "Was the same query run in the last five days?" or "Did the query result yield less than five records of individuals?". Many such decision trees are combined to form the forest. These come under ensemble methods as many trees (weak learners) are combined randomly.

FIG. 4 is a chart illustrating a privacy generator 66 of the privacy controller 14 of FIG. 1. The privacy generator 66 is a differential privacy (DP) generator 70 and adds an alteration quantity 68 to a result, thereby protecting user identity. In particular, only a portion of the records are changed, thereby providing plausible deniability. It is not possible to establish if data is truly associated with a person or randomly generated. In this way, adding or removing any one person's individual data to a dataset 62 should not materially change the results of a query 26. The aggregate statistical average remains unchanged. However, there needs to be a balance between utility (and accuracy) and privacy, as enhancing one compromises the other. The alteration quantity 68 may also be referred to as a privacy-budget (ϵ), sometimes referred to as privacy loss parameter.

For example, assume a database of just ten customers. In response to the question, 'Do you smoke?', seven have answered "Yes," and three have answered "No." Assume a noise margin of ±1 (although the noise margin is usually given as a percentage (e.g., 2%, 3%, etc.). The privacy generator 66 may add noise by changing values within a dataset based on a size of the dataset 62. When the query 26 is run, the query responses 60(1)-60(3) could be 6, 7, or 8 for "Yes." The table shows three possible query responses 60(1)-60(3) that could be provided by the privacy generator 66 in reference to the same query 26.

In certain embodiments, the privacy generator 66 relies upon Laplace distribution, but other statistical distributions (e.g., Gaussian noise, binomial, etc.) may also be used. Differential Privacy may be implemented in two modes. Global differential privacy refers to the case of adding noise to queries 26 on a database of records (e.g., U.S. census). Local differential privacy refers to adding noise at the device level (e.g., Apple iPhone, Google Chrome browser, etc.).

FIGS. 5A and 5B are charts illustrating a k-anonymity generator 72 to at least one of suppressing or generalizing values such that every individual within each generalized block 82(1)-82(3) is indistinguishable from at least k−1 other individuals. Each generalized block is based on selected attributes. For example, comparing FIGS. 5A and 5B, the chart of FIG. 5B has a k=3 anonymity because for the classes selected, such as postcode and age group, there are at least three records for each generalized block 82(1)-82(3).

FIG. 6 is a chart illustrating an I-diversity generator to ensure I different values of a sensitive attribute within each generalized block 84(1)-84(2). In particular, k-anonymous datasets are susceptible to homogenous pattern attacks and background knowledge attacks. As a result, I-diversity acts as an extension of k-anonymity to ensure that the anonymous record is well represented within each generalized block 84(1)-84(2). For example, the chart of FIG. 6 has an I=2 diversity because for each generalized block 84(1)-84(2), there are no more than two records that have the same sensitive attribute.

Figure 7:
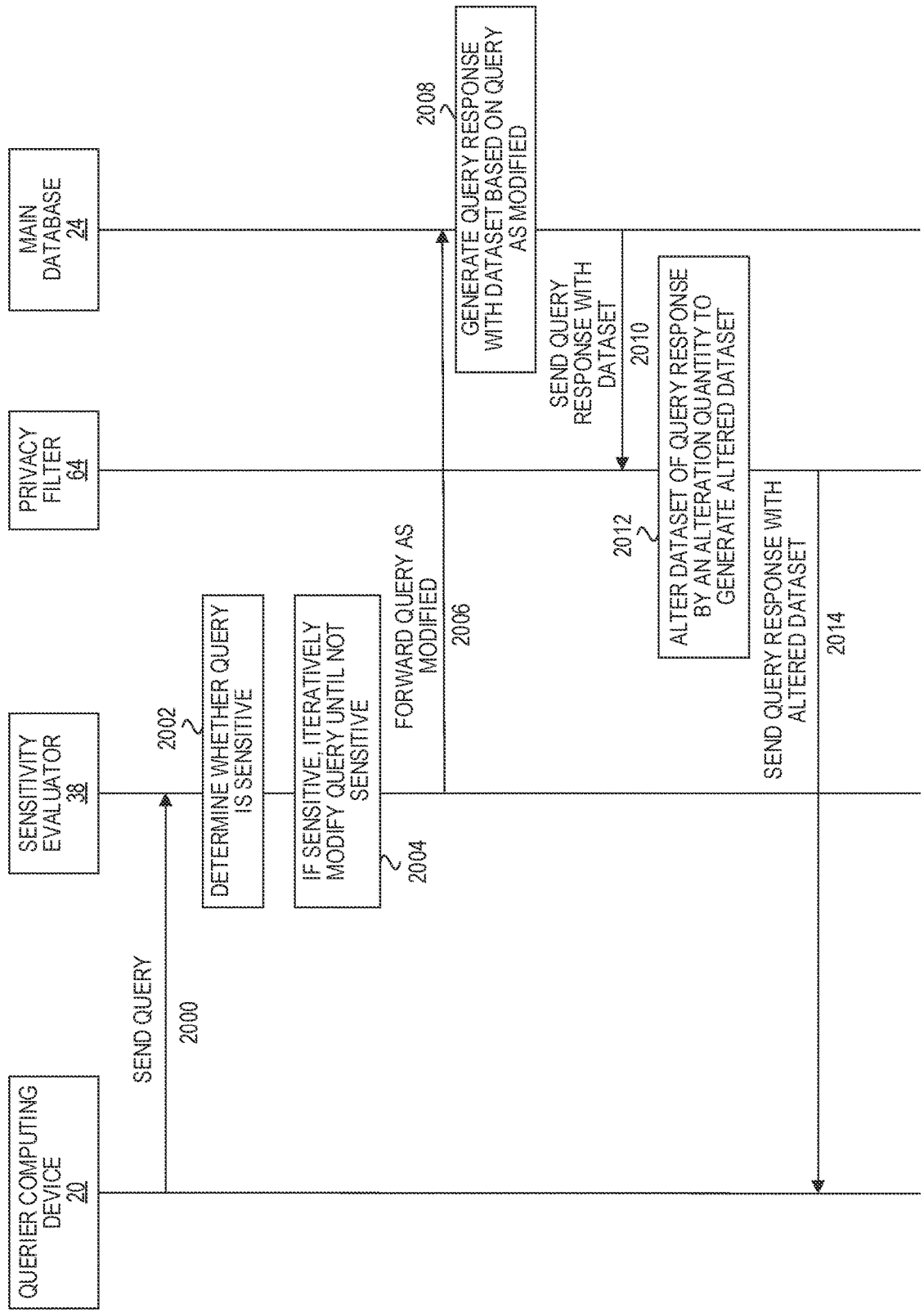
FIG. 7 is a message sequence diagram illustrating example messages communicated between and actions taken by several of the elements illustrated in FIG. 1, according to one embodiment.

FIG. 7 is a message sequence diagram illustrating example messages communicated between and actions taken by several of the elements illustrated in FIG. 1 to protect target user privacy in a query response 60 during a pre-campaign stage, according to one embodiment. The querier computing device 20 sends a query 26 toward a main database 24 to a sensitivity evaluator 38 of a privacy controller 14 (see FIG. 1) (2000). The sensitivity evaluator 38 of the privacy controller 14 determines whether the query 26 is sensitive (2002). If sensitive, the sensitivity evaluator 38 of the privacy controller 14 iteratively modifies the query 26 until not sensitive (2004). Once validated, the sensitivity evaluator 38 of the privacy controller 14 forwards the query 26' as modified to the main database 24 (2006). The main database 24 processes the query 26' and generates a query response 60 with a dataset 62 based on the query 26' as modified (2008). The main database 24 sends the query response 60 with the dataset 62 to the privacy filter 64 of the privacy controller 14 (2010). In certain embodiments, the main database 24 only generates the dataset 62 and forwards the dataset 62 to the privacy filter 64 of the privacy controller 14.

The privacy filter 64 of the privacy controller 14 alters the dataset 62 of the query response 60 by an alteration quantity 68 to generate an altered dataset 62' (2010). As noted above, in certain embodiments, the privacy controller 14 uses a DP generator 70, k-anonymity generator 72, and/or I-diversity generator 74, or any other privacy generator. The privacy filter 64 of the privacy controller 14 forwards the query response 60' with the altered dataset 62' to the querier computing device 20.

Figure 8:
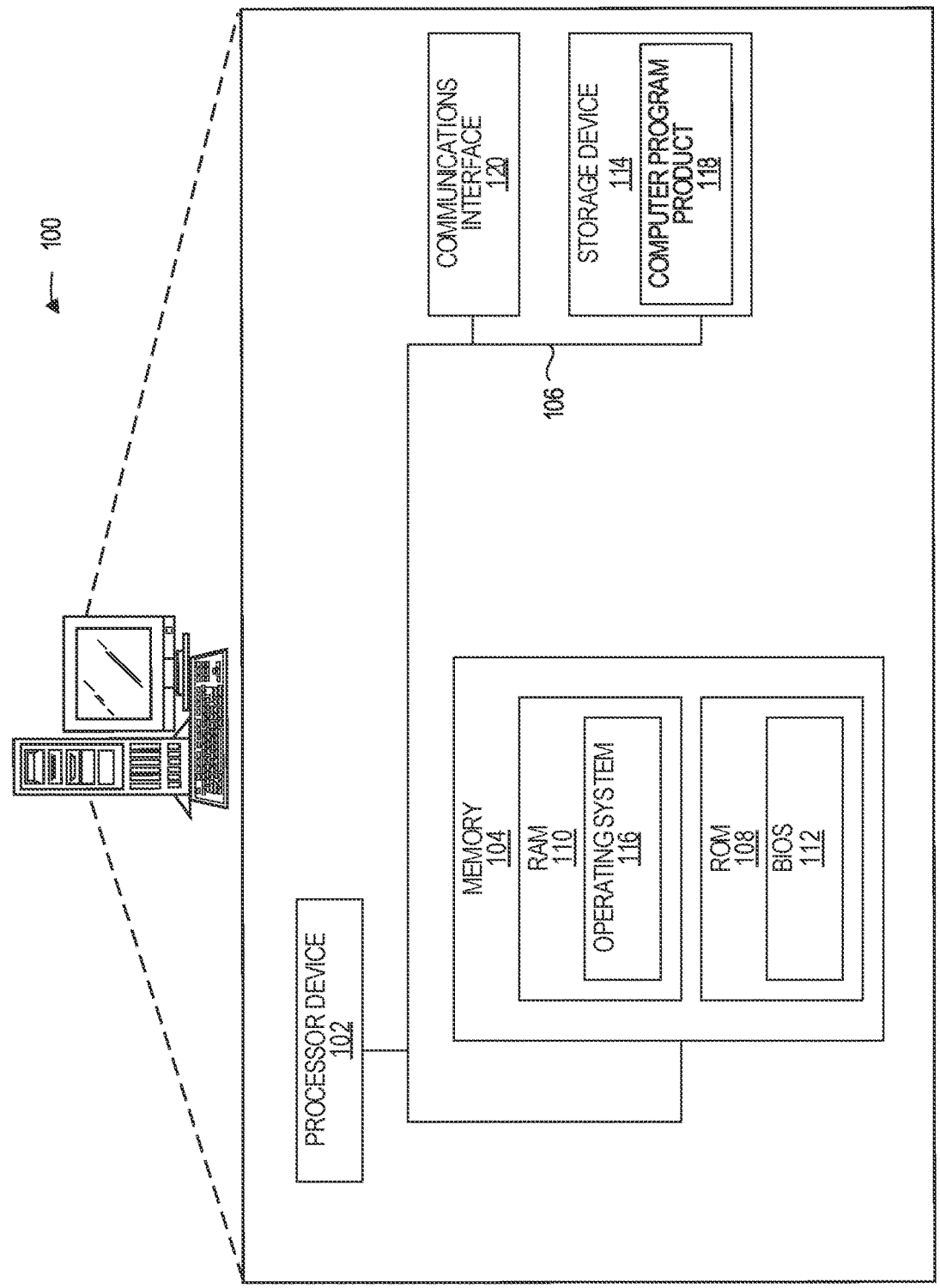
FIG. 8 is a block diagram of a computing device suitable for implementing one or more of the processing devices disclosed herein, according to one embodiment.

FIG. 8 is a block diagram of a computing device 100 containing components suitable for implementing any of the processing devices disclosed herein. The computing device 100 includes a processor device 102, a system memory 104, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the network manager in the volatile memory 110, may serve as a controller or control system for the computing device 100 that is to implement the functionality described herein.

The computing device 100 may also include one or more communication interfaces 120, depending on the particular functionality of the computing device 100. The communication interfaces 120 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
receiving, by a computing system comprising one or more processor devices, a query;
processing the query to determine a sensitivity classification of the query as sensitive or not sensitive;
determining, by the computing system based on the processing, that the query has the sensitivity classification of sensitive;
in response to determining that the query has the sensitivity classification of sensitive, iteratively modifying, by the computing system, the query until the query has the sensitivity classification of not sensitive by:
modifying the query to increase a scope of the query;
updating estimated query results based on the query as modified; and
determining whether the query as modified has the sensitivity classification of sensitive based on the estimated query results as updated; and
upon determining that the query as modified has the sensitivity classification of not sensitive, proceeding, by the computing system, with the query as modified.

2. The method of claim 1,
further comprising prior to determining that the query has the sensitivity classification of sensitive, generating, by the computing system, estimated query results based on the query;
wherein determining, by the computing system, that the query has the sensitivity classification of sensitive comprises:
determining, by the computing system, that the query has the sensitivity classification of sensitive based on the estimated query results.

3. The method of claim 1, wherein determining, by the computing system, that the query has the sensitivity classification of sensitive based on the estimated query results comprises:
determining that the query has the sensitivity classification of sensitive based on the estimated query results being of a number below a predetermined threshold.

4. The method of claim 1, wherein determining, by the computing system, that the query has the sensitivity classification of sensitive comprises:
determining, by the computing system, that the query has the sensitivity determining, by the computing system, that the query has the sensitivity classification of sensitive based on a combination of fields in the query.

5. The method of claim 1, wherein determining, by the computing system, that the query has the sensitivity classification of sensitive comprises:
determining, by the computing system, that the query has the sensitivity classification of sensitive based on similar queries originating from a same source.

6. The method of claim 1, further comprising training the computing system based on a query database, the query database comprising a plurality of queries, each of the plurality of queries classified as having the sensitivity classification of sensitive or having the sensitivity classification of not sensitive.

7. The method of claim 6, wherein the query database comprises at least one of:
historical queries comprising previously run queries;
transferred queries comprising externally run queries; or
created queries comprising queries automatically modified and run by the computing system.

8. The method of claim 1, wherein determining, by the computing system, that the query has the sensitivity classification of sensitive comprises:
evaluating the query using at least one of:
neural network-based supervised machine learning;
random forests, each with a plurality of decision trees, each decision tree with a pre-set condition to determine sensitivity; or
multinomial logistic regression.

9. The method of claim 1, wherein determining, by the computing system, that the query has the sensitivity classification of sensitive based on the estimated query results comprises:
classifying the query as having the sensitivity classification of sensitive or having the sensitivity classification of not sensitive.

10. The method of claim 1, wherein determining, by the computing system, that the query has the sensitivity classification of sensitive based on the estimated query results comprises:
grading the query on a sensitivity spectrum.

11. The method of claim 1, wherein iteratively modifying, by the computing system, the query until the query has the sensitivity classification of not sensitive comprises at least two iterative modifications.

12. The method of claim 1, wherein modifying the query to increase the estimated query results comprises expanding a range of a field of the query.

13. The method of claim 1, wherein modifying the query to increase the estimated query results comprises expanding a field of the query.

14. The method of claim 1, wherein modifying the query to increase the estimated query results comprises at least one of:
increasing a range of the query;
adding, to a sub-category of a parent category of the query, another sub-category to the query of the parent category;
expanding a sub-category of a parent category of the query to the parent category; or
changing a portion of the query to a wild card.

15. The method of claim 1, further comprising:
parsing, by the computing system, the query that was determined to have the sensitivity classification of sensitive;
determining, by the computing system, which factor was a largest contributor for the query having the sensitivity classification of sensitive.

16. The method of claim 15, wherein modifying the query to increase the scope of the query comprises, for at least one iteration:
modifying the query to increase the scope of the factor that was the largest contributor for the query having the sensitivity classification of sensitive.

17. The method of claim 1, further comprising altering, by the computing system, a dataset of a query response by an alteration quantity for transmission, the alteration quantity based on a size of the dataset in the query response.

18. The method of claim 17, wherein altering the dataset comprises altering the dataset using at least one of:
a differential privacy generator to add noise by changing values within the dataset based on a size of the dataset;
a k-anonymity generator to at least one of suppress or generalize values such that every individual within each generalized block is indistinguishable from at least k−1 other individuals, each generalized block based on selected attributes; or an l-diversity generator to ensure l different values of a sensitive attribute within each generalized block.

19. A computing system comprising:
one or more processor devices of one or more computing devices, the one or more processor devices configured to:
  receive a query;
  process the query to determine a sensitivity classification of the query as sensitive or not sensitive;
  determine, based on the processing, that the query has the sensitivity classification of sensitive;
  in response to determining that the query has the sensitivity classification of sensitive, iteratively modify the query until the query has the sensitivity classification of not sensitive by:
    modifying the query to increase a scope of the query;
    updating estimated query results based on the query as modified; and
    determining whether the query as modified has the sensitivity classification of sensitive based on the estimated query results as updated; and
  upon determining that the query as modified has the sensitivity classification of not sensitive, proceed with the query as modified.

20. A computer program product stored on a non-transitory computer-readable storage medium and including instructions to cause one or more processor devices to:
  receive a query;
  process the query to determine a sensitivity classification of the query as sensitive or not sensitive;
  determine, based on the processing, that the query has the sensitivity classification of sensitive;
  in response to determining that the query has the sensitivity classification of sensitive, iteratively modify the query until the query has the sensitivity classification of not sensitive by:
    modifying the query to increase a scope of the query;
    updating estimated query results based on the query as modified; and
    determining whether the query as modified has the sensitivity classification of sensitive based on the estimated query results as updated; and
  upon determining that the query as modified has the sensitivity classification of not sensitive, proceed with the query as modified.

* * * * *